UNITED STATES PATENT OFFICE.

HARRY H. HAZELTINE AND MORTON GREGORY, OF TACOMA, WASHINGTON, ASSIGNORS TO WESTERN RUBBER COMPANY, OF PIERCE COUNTY, WASHINGTON.

RUBBER SUBSTITUTE AND PROCESS FOR PRODUCING SAME.

1,360,744.   Specification of Letters Patent.   Patented Nov. 30, 1920.

No Drawing.   Application filed March 16, 1918. Serial No. 222,939.

*To all whom it may concern:*

Be it known that we, HARRY H. HAZELTINE and MORTON GREGORY, citizens of the United States, residing at Tacoma, in the county of Pierce and State of Washington, have invented certain new and useful Improvements in Rubber Substitute and Processes for Producing Same, of which the following is a specification.

This invention relates to a new material and process for its production, said material resembling rubber in appearance, behavior and uses, and may be compounded and vulcanized similar to rubber, it being possible to displace large per cents. of the highest grade rubber, while the lower grade rubbers may be displaced entirely. It has been the custom in rubber manufacture and similar arts to displace certain limited per cents. of rubber by the use of sulfurized oils (known as factice), as well as such oils in combination with other substances sulfurized and known under various trade names.

It is well known that these sulfurized oils (under whatever name they may be called) are made by applying heat to the mixture of some fixed oil or oils and sulfur in certain per cents. or proportions until a certain temperature has been attained and sufficient time elapsed to cause the oil or oils and sulfur to react and solidify, it being well known that at the time of and during such re-action, sulfureted and carbureted hydrogen and other by-products are produced, some of which are given off.

We have discovered that any or all the fixed oils of the vegetable or animal kingdoms when mixed with sulfur in proper per cents. (or in conjunction with other substances which are supposed to act as a catalyst) and introduced into an open receptacle and regulated heat applied until the air and moisture be expelled as far as possible, closing the vessel air and moisture tight as far as possible and then subjecting the contents of the vessel to agitation and heat for an appropriate period of time, at the end of such period of time a resultant product is secured, which differs from any product made from or by any oil and sulfur combination heretofore produced.

We have found that it is desirable to expel not only substantially all the air and moisture from the mixture itself, but from the vessel as well before beginning the process. This of course, may be done by first expelling the air and moisture from the mixture and then placing the mixture within a vessel which has been previously heated to the desirable temperature.

We have further discovered that by preventing the escape of the sulfureted and carbureted hydrogen, and other by-products, pressure within the receptacle is produced during the re-action which takes place upon the application of agitation and regulated heat, and that by then taking advantage of their nascent condition a new combination of elements takes place and a resultant product secured, which differs from anything heretofore discovered.

As before alluded to, it is necessary to regulate the temperature, agitation and time, for it is a known fact that the greater the heat the more violent the re-action, and that continuous agitation is superior to intermittent agitation and consequently, the time required to produce our new substance is either lengthened or shortened dependent upon the per cent. content of sulfur, degree of heat and constant or non-constant agitation.

It will of course, be understood that agitation is a necessary step in our improved process, but by this, it is not meant that manual or mechanical agitation is necessary, because it is well known that if a fluid be confined within a closed vessel and heat applied evenly to every point of the exterior walls thereof no agitation occurs, but on the contrary, if heat be applied beneath the vessel, agitation will occur which is incident to such heating.

As a concrete illustration: If a mixture of fish oil 90 parts and sulfur 10 parts be introduced into a closed receptacle, air and moisture expelled as far as possible by heat before closing the receptacle, the receptacle closed and a temperature of approximately 175 degrees centigrade be maintained for approximately four hours, accompanied by moderate agitation, it will be found that a rubber like substance results, which may be utilized as before mentioned.

As another concrete illustration, if a mixture of fish oil 80 parts and sulfur 20 parts be introduced into a closed receptacle, air and moisture having been expelled as far as possible before closing the receptacle, and a temperature of approximately 170 degrees centigrade be maintained for approximately two hours, together with moderate agitation, it will be found that a rubber like substance results, which may be used as before mentioned.

If blown or oxidized oils be used, the length of time and the amount of sulfur required are reduced.

If catalysts or accelerators, such as zinc oxid, litharge, magnesia, or similar substances be used, it will be found that the per cent. of sulfur content, degree of temperature and time required will be lessened, dependent upon the per cent. of catalyst or accelerator used.

As an example of the above: If 85 parts of fish oil, 10 parts of sulfur and 5 parts of litharge be introduced into a receptacle, air and moisture being expelled as far as possible before closing; a temperature of approximately 175 degrees centigrade maintained meanwhile, the vessel being now closed and the heat continued together with moderate agitation, it will be found that at the end of approximately two hours from the time of closure of the vessel a rubber like substance results, which may be used as before mentioned.

The rubber like substance resulting, as before described, varies in color, dependent upon the kind and quality of the fixed oil used. To illustrate: If linseed, rape seed, hemp seed, cotton seed or like oil be used with sulfur at a temperature of approximately 160 degrees centigrade, a light brown or yellow product will be secured. If fish oil or some poor quality oil be used at say approximately 175 degrees centigrade, a brown product will result. And if litharge, as before illustrated, be used, a black product results.

All products of the above re-actions, after being allowed to dry (some water during re-action being formed) may be sheeted between rolls, are not sticky and may be compounded and vulcanized similar to rubber.

As before mentioned, some water is formed during the re-actions, and it has been found good practice to dry the new substance in open heat at about 140 degrees centigrade, not only to remove the moisture but to remove any free sulfur. To accomplish this, the length of time required is dependent upon the thickness of the mass or sheet introduced into the drier for drying.

We are aware of the fact that fixed oils of many kinds (animal and vegetable, plain, blown and oxidized), together with sulfur or other reducing or oxidizing substance, have been and are used, either alone or in combination with other substances, to make or produce a rubber like substance or substances, most of which methods are old and well known and have been in use in the arts for many years, but the utilization of substantially all of the products resultant from the reactions during the processes above fully set forth, and the ultimate product, are believed to be new in the arts.

We have shown a particular form of embodiment of our invention but we are aware that many minor changes in the product as well as similar changes in the steps in the process for producing the same will readily suggest themselves to others skilled in the art without departing from the spirit and scope of our invention, and we therefore desire to avoid being strictly limited to the means hereinabove shown and described.

What we claim as new and desire to protect by Letters Patent, is—

1. The herein described process of producing a rubber like substance, consisting of treating by heat a mixture of fixed oils and sulfur substantially free from air and moisture under pressure until the period of the elements reacting has ceased.

2. A rubber like substance produced by mixing a fixed oil and sulfur, substantially free from air and moisture and subjecting same to heat, pressure and agitation until the period of the elements reacting has ceased.

3. A rubber like substance comprising a fixed oil and a vulcanizing agent, substantially free from air and moisture, and subjected to heat, pressure and agitation until the period of the elements reacting has ceased.

4. A rubber like substance comprising a fixed oil and a vulcanizing agent, substantially free from air and moisture, and subjected to heat and pressure, until the period of the elements reacting has ceased.

5. A rubber like substance comprising a fixed oil, a vulcanizing agent and an accelerator, substantially free from air and moisture, and subjected to heat and pressure and agitation until the period of the elements reacting has ceased.

6. A rubber like substance comprising a fixed oil, a vulcanizing agent and an accelerator, substantially free from air and moisture, and subjected to heat and pressure until the period of the elements reacting has ceased.

7. A rubber like substance comprising a mixture of fixed oil, sulfur and zinc oxid, substantially free from air and moisture, having been subjected to heat, pressure and agitation until the period of the elements reacting has ceased.

8. The herein described process of producing a rubber like substance consisting of placing within an open vessel, a fixed oil and sulfur and subjecting the mixture to heat until substantially all the air and moisture be expelled and agitating the mixture under substantially air and water tight conditions in the presence of heat until the period of the elements reacting has ceased.

9. The herein described process of producing a rubber like substance consisting of mixing fixed oil and sulfur from which substantially all of the air and moisture have been extracted, under substantially air and moisture tight conditions, and agitating the same in the presence of heat until the period of the elements reacting has ceased.

10. The herein described process of producing a rubber like substance consisting of mixing fixed oil and sulfur from which substantially all the air and moisture have been extracted, extracting substantially all the air and moisture from the mixture and subjecting the same to heat until the period of the elements reacting has ceased.

11. The herein described process of producing a rubber like substance consisting of fixed oil, sulfur, expelling practically all air and moisture, subjecting the mixture to heat while under pressure and meanwhile agitating the mixture.

12. The herein described process of producing a rubber like substance consisting of mixing fish oil 80 parts, sulfur 20 parts, expelling practically all air and moisture, subjecting the mixture to approximately 170 degrees centigrade under pressure for approximately two hours, meanwhile agitating the mixture.

In testimony whereof we affix our signatures in the presence of a witness.

HARRY H. HAZELTINE.
MORTON GREGORY.

Witness:
WINIFRED KNOPH.